Dec. 22, 1942.　　C. J. FREDERIKSEN　　2,305,959
TRACTOR MOWER
Filed March 19, 1942　　2 Sheets-Sheet 1

INVENTOR
Carl J. Frederiksen
BY
ATTORNEYS

Dec. 22, 1942.   C. J. FREDERIKSEN   2,305,959
TRACTOR MOWER
Filed March 19, 1942   2 Sheets-Sheet 2
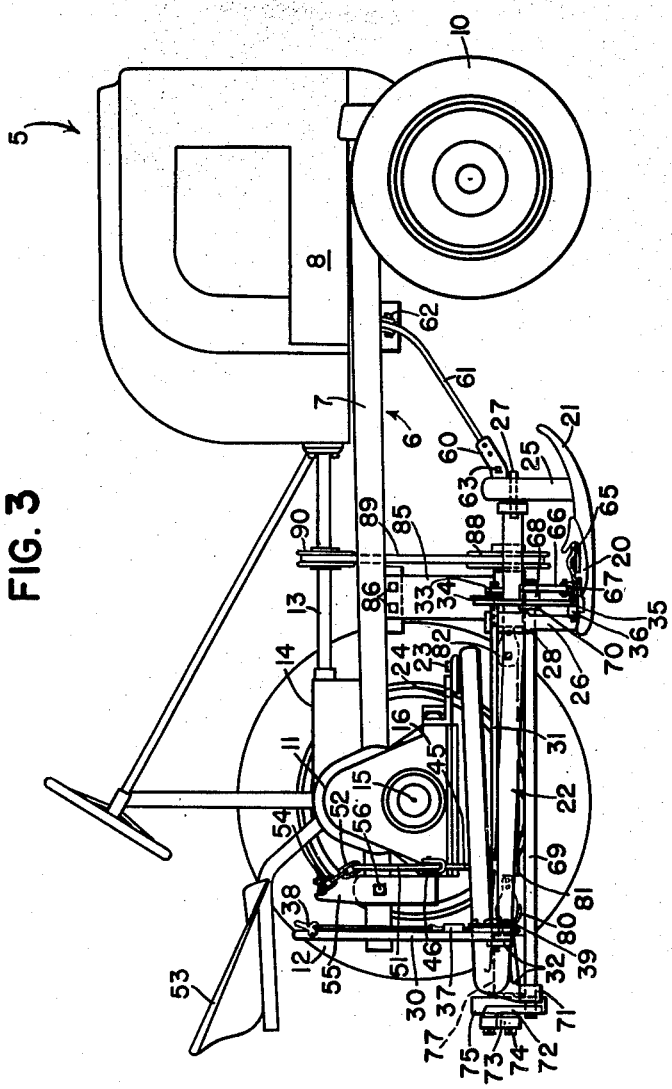
FIG. 3
INVENTOR
Carl J. Frederiksen
BY 
ATTORNEYS Patented Dec. 22, 1942

2,305,959

UNITED STATES PATENT OFFICE 2,305,959

TRACTOR MOWER

Carl J. Frederiksen, Moline, Ill., assignor to Deere & Company, Moline, Ill., a corporation of Illinois Application March 19, 1942, Serial No. 435,347

13 Claims. (Cl. 56—25)

The present invention relates to tractor mowers and more particularly to that type of tractor mower in which the cutter bar is disposed transversely at one side of the tractor body ahead of one of the wheels of the tractor and is supported on an arm which is pivotally connected to the tractor adjacent the opposite side thereof and thus providing for rearward swinging movement of the entire cutter bar and supporting shoe when the cutter bar encounters an obstruction in the field during operation. One mower of this type is disclosed in my Patent No. 2,240,292, granted April 29, 1941, and in an application, Serial No. 257,804, filed February 23, 1939 by W. J. Coultas.

It is necessary in mowers of this type, to provide for a rearward yielding movement of the inner end of the cutter bar and shoe as well as the outer end, in order to prevent damage to the mower parts when an obstruction is encountered by the mower shoe or inner end of the cutter bar. One of the main problems involved in the design of this type of mower is the provision of supporting means for the mower cutter bar which accommodates movement of the latter from a transverse position ahead of the transverse axis of the tractor wheels to a trailing position behind the latter. In the above-mentioned Coultas application and in my prior patent, is disclosed a mower in which a ramp is provided over which the wheel of the tractor rolls as the cutter bar swings rearwardly.

The principal object of the present invention relates to the provision of a support for a cutter bar in a mower of this type, which accommodates the rearward swinging movement of the cutter bar from a position ahead of the wheel to a trailing position behind the wheel but without the necessity for lifting the tractor wheel over the cutter bar.

Other objects and advantages of my invention will be apparent to those skilled in the art after a consideration of the following description, in which reference is had to the drawings appended hereto, in which:

Figure 3 is a side elevational view of the tractor mounted mower, the rear wheel of the tractor being removed to more clearly show the construction of the mower.

Figures 1, 2:
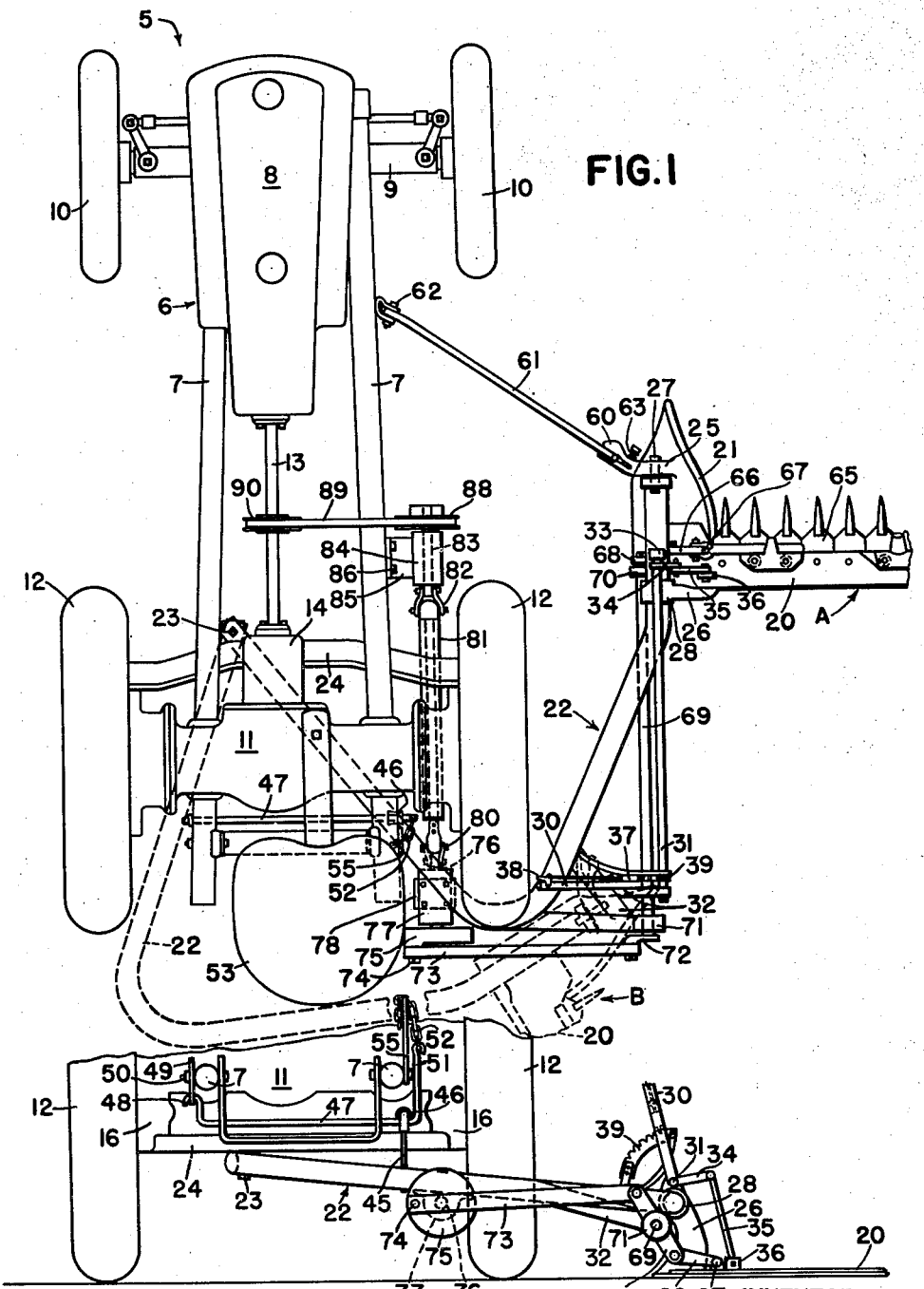
Figure 1 is a plan view of a tractor mower embodying the principles of my invention.
Figure 2 is a rear elevational view of the mower and a portion of the tractor.

Referring now to the drawings, the tractor, indicated in its entirety by reference numeral 5, comprises a longitudinally extending body 6, including a pair of laterally spaced longitudinally extending frame members 7 on which is supported an engine compartment 8. The forward end of the body is supported on a transverse axle 9, at opposite ends of which is journaled a pair of dirigible front supporting wheels 10. The rear ends of the frame members 7 are fixed to a transverse rear axle housing 11, which is carried on a pair of laterally spaced rear traction wheels 12. The wheels 12 are driven through a longitudinally extending power shaft 13, which is connected with the engine of the tractor and with suitable transmission gearing disposed within a casing 14. The transmission gearing is connected by any suitable means known to those skilled in the art to the wheel axles 15 journaled within depending axle housings 16 at opposite ends of the transverse housing 11.

The cutter bar 20 in its normal operating position, indicated in solid lines in position A, is disposed transversely at one side of the tractor body 6 intermediate the front and rear wheels 10, 12. The cutter bar 20 is fixed to a shoe 21. The shoe 21 is swingably mounted on the outer end of a supporting member in the form of an arm 22, which is connected by a vertical pivot bolt 23 to a transverse frame member 24, which is supported on the two depending axle housings 16. The arm 22, which is shown as being cylindrical in form, extends rearwardly and outwardly around the rear of the rear traction wheel 12, and then turns forwardly along the outer side of the wheel 12 to the cutter bar shoe 21. The shoe 21 is provided with a pair of longitudinally spaced vertically disposed supports or standards 25, 26 and the forward end of the arm 22 is pivotally connected to the forward standard 25 by means of a fore and aft extending pivot pin 27. The rear standard 26 is provided with a hub 28, in which the cylindrical arm 22 is journaled in longitudinal alignment with the axis of the pin 27, thus providing for vertical swinging movement of the shoe and cutter bar about this axis.

The cutter bar is swingable vertically about the axis of the pin 27 by means of a manually actuated control lever 30, fixed to a longitudinally extending shaft 31, which is journaled at its rear end on a frame structure 32 carried on the arm 22 adjacent the rear wheel 12. The shaft 31 extends forwardly and is journaled in a bearing hub 33 fixed to the supporting arm 22 adjacent its forward end. The shaft 31 is provided with a laterally outwardly extending crank arm 34, the outer end of which is connected by a link 35 to a lug 36, which is rigidly mounted on the cutter bar 20. Thus, by moving the lever 30 about the axis of the shaft 31 toward the tractor wheel 12, the arm 34 is raised, thereby raising the cutter bar through the link 35 about the axis of the forward end of the arm 22. The lever 30 is secured in any position of adjustment by means of a latch 37 actuated by a grip lever 38 at the upper end of the lever 30, the latch engaging a notched sector 39, which is mounted on the framework 32.

The pivot connection 23 is sufficiently loose to provide a limited amount of vertical swinging movement of the arm 22 for the purpose of raising and lowering the cutter bar bodily, including the inner end and shoe of the latter. This is accomplished by means of a lifting connection including a vertical hanger 45, fixed to the arm 22 and carrying at its upper end, a small roller 46 journaled thereon and adapted to roll along a track member 47 in the form of a transversely disposed rod, one end of which is provided with an upwardly extending hook 48 engaged in a plate 49, which is bolted at 50 to the rear end of the frame member 7 on the opposite side of the tractor from the mower. The track rod 47 extends transversely beneath the opposite frame member 7 and has an upwardly turned end 51, to which a chain 52 is connected. The chain 52 is within convenient reach of the tractor operator when positioned in the operator's seat 53 on the tractor, and by lifting the chain 52, the arm 22 can be raised about the pivot connection 23. The chain 52 can be hooked over a notch 54 in the upper end of a plate 55 bolted at 56 to the rear end of the frame member 7.

The cutter bar 20 and arm 22 are swingable rearwardly about the pivot 23 from the operating position A to a trailing position B, indicated in dotted lines, behind the adjacent rear wheel 12 of the tractor. When the arm 22 moves from position A to position B, the roller 46 rolls laterally along the rod 47. The track 47 swings rearwardly on the chain 52 and hook 48 to accommodate the arcuate path of movement of the supporting hanger 45.

Inasmuch as the cutter bar lifting lever 30 and its connecting mechanism are mounted entirely on the arm 22, they swing rearwardly with the arm at all times.

During operation, the cutter bar is releasably secured in operating position A by means of a latch or detent member 60, which engages the outer end of a draft rod 61 extending forwardly and inwardly to a pivot connection 62 on the side of the tractor body on the adjacent frame member 7. The pivot connection 62 provides for a vertical swinging movement of the cutter bar. The latch is held in yielding engagement with the end of the rod 61 by means of a spring 63. In general, latches of this type are well-known to those skilled in the art, and are used for the purpose of holding the cutter bar in transverse operating position, and transmit draft force to the cutter bar. When the latter encounters an obstruction in the field, such as a rock or stump, the increased resistance to forward movement overcomes the action of the spring 63 and pulls the latch 60 out of engagement with the draft rod 61, thereby releasing the cutter bar and arm 22 for rearward swinging movement about the pivot bolt 23. One of the features of the present invention is that the shoe and inner end of the cutter bar moves rearwardly with the cutter bar when an obstruction is encountered, thereby providing for protection to the mower in case the shoe encounters the obstruction. In the past, tractor mowers of the side mounted type have usually been supported for rearward swinging movement about a vertical axis which passed either directly through the shoe itself or closely adjacent thereto. This did not provide for sufficient rearward movement of the shoe upon encountering an obstruction, to offer much protection. It will be noted that in the present invention the cutter bar supporting arm is pivoted at a point on the tractor frame on the side opposite to the side at which the mower is disposed, and since the arm passes around the rear of the tractor wheel 12, there is no interference with the latter when the cutter bar swings rearwardly. By positioning the pivot 23 forward of the rear axle housing 11 and substantially in transverse alignment with the cutter bar, the swinging movement of the latter is directly rearwardly and inwardly from the operating position. If desired, the pivot bolt 23 can be located rearwardly of the position shown in the drawings, which would permit the use of a shorter supporting arm 22 and would also permit the cutter bar to swing inwardly beyond the plane of the adjacent tractor wheel 12, but in such case, the path of rearward swinging movement of the mower would curve outwardly from the operating position.

The cutter bar 20 is provided with a conventional sickle 65, which reciprocates in the usual manner on the cutter bar and is driven through a pitman rod 66 connected by a universal joint 67 to the sickle, the opposite end of the pitman being connected to a crank arm 68, which is rigidly fixed to a fore and aft extending shaft 69. The shaft 69 is journaled at its forward end in a bearing 70, which is mounted on the arm 22 just ahead of the bearing hub 28, and extends rearwardly beneath the arm 22. The rear end of the shaft 69 is journaled in a hub 71, which is supported on the framework 32, rigidly fixed to the arm 22 adjacent the point at which the latter curves around the rear of the tractor wheel. A crank arm 72 is rigidly fixed to the rear end of the shaft 69 behind the supporting bearing 71. The crank arm 72 is reciprocated by means of a pitman 73 which is disposed transversely and journaled on a crank pin 74 which is fixed to a flywheel 75. The flywheel is mounted on a shaft 76, which is journaled in a bearing 77 mounted on a horizontal plate 78 which is rigidly fixed, as by welding, to the arm 22 adjacent the inner side of the rear tractor wheel 12. The shaft 76 is connected through a universal joint 80, a telescoping shaft 81, and a second universal joint 82 to a drive shaft 83, which is journaled in a bearing hub 84 carried on a depending supporting member 85 which is secured to the tractor frame member 7 by bolts 86. A V-belt pulley 88 is fixed to the forward end of the shaft 83 and is connectted by a V-belt 89 to a driving pulley 90 mounted on the tractor power shaft 13. When the mower swings rearwardly the telescoping shaft 81 extends and maintains the driving connection with the sickle, although the telescoping members 81 may be shortened, if desired, to cause them to pull apart when the mower swings rearwardly, and thus disconnect the sickle from the power connection. Obviously, any other conventional means known in the art for interrupting the drive to the sickle, may be employed.

I claim:

1. A mower comprising a frame supported on wheels, a cutter bar disposed transversely at one side of said frame and ahead of the axis of one of said supporting wheels, a supporting member for said cutter bar, said member extending around the rear of said wheel, and means for pivotally mounting the inner end of said member on said frame on the opposite side of the plane of rotation of said wheel providing for horizontal swinging movement of said member and cutter bar relative to said frame.

2. A mower comprising a frame supported on wheels, a cutter bar disposed transversely at one side of said frame and ahead of the axis of one of said supporting wheels, a supporting member for said cutter bar, said member extending around the rear of said wheel, and means for pivotally mounting the inner end of said member on said frame on the opposite side of the plane of rotation of said wheel providing for horizontal swinging movement of said member and cutter bar relative to said frame, said pivotal mounting means being disposed ahead of said axis.

3. A mower comprising a frame supported on wheels, a cutter bar disposed transversely at one side of said frame and ahead of the axis of one of said supporting wheels, a supporting member for said cutter bar, said member extending around the rear of said wheel, means for pivotally mounting the inner end of said member on said frame on the opposite side of the plane of rotation of said wheel providing for horizontal swinging movement of said member and cutter bar relative to said frame, and draft means connecting said cutter bar and frame ahead of said one wheel, said draft means being releasable to permit said cutter bar to swing rearwardly upon encountering an obstruction during operation.

4. In combination a tractor body, front and rear supporting wheels therefor, a cutter bar disposed transversely at the side of said body intermediate the axis of said front and rear wheels, a shoe on which said cutter bar is mounted, an arm for supporting said shoe, said arm extending from said shoe rearwardly behind the adjacent rear tractor wheel and pivotally mounted on said tractor body between the rear wheels, providing for rearward swinging movement of said arm and cutter bar.

5. In combination a tractor body, front and rear supporting wheels therefor, a cutter bar disposed transversely at the side of said body intermediate the axes of said front and rear wheels, a shoe on which said cutter bar is mounted, a U-shaped arm connected to said shoe and extending rearwardly of the adjacent tractor wheel and pivotally mounted on said tractor body intermediate the front and rear supporting wheels, and draft means connecting said cutter bar with the forward portion of said tractor body.

6. In combination a tractor body, front and rear supporting wheels therefor, a cutter bar disposed transversely at the side of said body intermediate the axes of said front and rear wheels, a shoe on which said cutter bar is mounted, an arm for supporting said shoe, said arm extending from said shoe rearwardly behind the adjacent rear tractor wheel and pivotally mounted on said tractor body between the rear wheels, providing for rearward swinging movement of said arm and cutter bar, and a draft link connected between said cutter bar and the forward portion of said tractor frame ahead of said wheel, said link including releasable latch means for normally holding said cutter bar in transverse operating position but yieldable to allow said cutter bar and arm to swing rearwardly when said cutter bar encounters an obstruction in the field.

7. In combination a tractor body, front and rear supporting wheels therefor, a cutter bar disposed transversely at the side of said body intermediate the axes of said front and rear wheels, a shoe on which said cutter bar is mounted, an arm for supporting said shoe, said arm extending from said shoe rearwardly behind the adjacent rear tractor wheel and pivotally mounted on said tractor body between the rear wheels, providing for rearward swinging movement of said arm and cutter bar, a power transmitting shaft journaled on said arm and swingable therewith, said shaft being operatively connected with cutting apparatus on said cutter bar, and a flexible connection between said shaft and the tractor engine.

8. In combination a tractor body, front and rear supporting wheels therefor, a cutter bar disposed transversely at the side of said body intermediate the axes of said front and rear wheels, a shoe on which said cutter bar is mounted, an arm on which said shoe is pivotally mounted by means providing for vertical swinging movement in a transverse plane, said arm extending from said shoe rearwardly behind the adjacent rear tractor wheel and pivotally mounted on said tractor body between the rear wheels, providing for rearward swinging movement of said arm and cutter bar, and mechanism mounted on said arm and swingable rearwardly therewith for swinging said cutter bar upwardly relative to said arm.

9. In combination a tractor body, front and rear supporting wheels therefor, a cutter bar disposed transversely at the side of said body intermediate the axes of said front and rear wheels, a shoe on which said cutter bar is mounted, an arm for supporting said shoe, said arm extending from said shoe rearwardly behind the adjacent rear tractor wheel and pivotally mounted on said tractor body between the rear wheels, providing for rearward swinging movement of said arm and cutter bar, and supporting means adjacent said rear wheel for supporting the intermediate portion of said arm on said tractor body, said supporting means being flexible to accommodate said rearward swinging movement of said arm relative to said tractor.

10. The combination with a vehicle having laterally spaced wheels, and having a power take-off, of a frame pivoted to said vehicle between said wheels, for rearward swinging movement and extending around the rear of one of said wheels to a point laterally beyond the outer side thereof and having a forwardly projecting part on the outer end thereof, tool means supported on the forward end of said part, a longitudinally extending drive member supported on said part and connected at its forward end to said tool means for driving the latter, a driving connection to the rear of said one wheel and operatively connecting said drive member with said power take-off, and means for releasably holding said frame against rearward swinging movement.

11. The combination of claim 10 in which the point of pivotal connection of the frame to the vehicle is substantially on the transverse vertical plane of the tool, whereby there is substantially no outward component to the rearward swinging movement of the tool.

12. The combination with a vehicle having a supporting wheel, tool means disposed at one side of said wheel ahead of the axis thereof, a supporting member for said tool means extending around the rear of said wheel to the other side thereof, means pivotally connecting said member to said vehicle at said other side of said wheel for rearward swinging movement, and means for releasably holding said member against rearward swinging movement.

13. The combination of claim 12 in which the point of pivotal connection of the member to the vehicle is substantially in the transverse vertical plane of the tool whereby there is substantially no outward component to the rearward swinging movement of the tool.

CARL J. FREDERIKSEN.